(12) United States Patent
Furuya

(10) Patent No.: US 7,489,862 B2
(45) Date of Patent: Feb. 10, 2009

(54) PRESENTATION DEVICE

(75) Inventor: Masataka Furuya, Nagoya (JP)

(73) Assignee: Elmo Company Limited (JP)

( * ) Notice: Subject to any disclaimer, the term of this patent is extended or adjusted under 35 U.S.C. 154(b) by 378 days.

(21) Appl. No.: 11/191,825

(22) Filed: Jul. 27, 2005

(65) Prior Publication Data
US 2006/0159439 A1 Jul. 20, 2006

(30) Foreign Application Priority Data
Jan. 14, 2005 (JP) ............................. 2005-007523

(51) Int. Cl.
G03B 17/00 (2006.01)
(52) U.S. Cl. ..................... 396/86; 396/133; 348/240.1
(58) Field of Classification Search .................. 396/86, 396/133; 348/240.1
See application file for complete search history.

(56) References Cited

U.S. PATENT DOCUMENTS

| 5,198,847 | A  | * | 3/1993  | Takahashi ..................... 396/86 |
| 5,883,697 | A  | * | 3/1999  | Ohyama ....................... 355/18 |
| 6,148,151 | A  | * | 11/2000 | Bauer ........................... 396/56 |
| 6,292,313 | B1 | * | 9/2001  | Kanayama et al. ........... 359/823 |
| 6,633,436 | B2 | * | 10/2003 | Wada et al. .................. 359/681 |
| 6,650,367 | B1 | * | 11/2003 | Kyuma ..................... 348/240.1 |
| 6,704,503 | B2 | * | 3/2004  | Yoshikawa et al. ............ 396/76 |
| 2001/0040638 | A1 | * | 11/2001 | Yoshikawa et al. .......... 348/358 |
| 2003/0112336 | A1 | * | 6/2003  | Reed et al. ................ 348/211.8 |
| 2003/0113015 | A1 | * | 6/2003  | Tanaka ........................ 382/176 |
| 2004/0028263 | A1 | * | 2/2004  | Sakamoto .................... 382/128 |
| 2004/0033070 | A1 | * | 2/2004  | Haraguchi et al. ............. 396/84 |
| 2004/0036663 | A1 | * | 2/2004  | Bevers et al. .................... 345/7 |
| 2004/0130632 | A1 | * | 7/2004  | Shiraishi .................. 348/223.1 |
| 2005/0036185 | A1 | * | 2/2005  | Gagliano et al. ............ 359/196 |
| 2005/0036206 | A1 | * | 2/2005  | Wada .......................... 359/676 |
| 2005/0110891 | A1 | * | 5/2005  | Natsume ..................... 348/345 |
| 2005/0168627 | A1 | * | 8/2005  | Yi et al. ....................... 348/373 |
| 2005/0243073 | A1 | * | 11/2005 | Hashimoto et al. .......... 345/184 |

FOREIGN PATENT DOCUMENTS

JP 2002-333660 11/2002

* cited by examiner

Primary Examiner—W. B. Perkey
Assistant Examiner—Warren K Fenwick
(74) Attorney, Agent, or Firm—Ostrolenk, Faber, Gerb & Soffen, LLP

(57) ABSTRACT

The presentation device 100 comprises a shuttle operation member 170 rotatable in the forward and reverse directions. The shuttle operation member 170 comprises a momentary mechanism, returning automatically to the neutral position when the user releases the hand. When a sub-microprocessor 360 inputs from the shuttle operation member 170 signals representing operating direction and operating angle, on the basis of these signals, it determines a zoom direction and zoom speed, and by giving an instruction to a lens control microprocessor 127 or a picture signal processor IC 300, performs optical zoom or digital zoom. By means of this correction, operability in zoom operations in the presentation device is improved.

9 Claims, 6 Drawing Sheets

PRESENTATION DEVICE

CLAIM OF PRIORITY

The present application claims priority from Japanese application 2005-7523 filed on Jan. 14, 2005, the content of which is hereby incorporated by reference into this application.

BACKGROUND

1. Field of the Invention

The present invention relates to a presentation device for capturing documents and displaying them on an external monitor or the like.

2. Description of the Related Art

With most presentation devices to date, separate control buttons were provided for adjusting zoom depending on zoom direction, i.e. one for the telephoto end and one for the wide end. In order to adjust zoom in the document presentation device, it was necessary to perform operations while verifying the location of each control button.

With respect to zoom control design, Japanese Patent Laid-Open Gazette 2002-333660A teaches technology relating to a still camera furnished with a jog dial. The cited publication teaches performing zoom operations by rotating the jog dial, with the zoom direction switched depending on the direction of rotation. With such a jog dial, zoom operation to the telephoto end and zoom operation to the wide end can be accomplished with a single control element, making it unnecessary to verify the locations of multiple buttons, as with the prior art.

In a compact type still camera, the zoom factor is typically about 2-3×, so the operation of rotating the jog dial is not especially difficult for the user, even when zooming from the wide end to the telephoto end. More recent presentation devices, however, have zoom factors as high as 10-20×, making it necessary in some instances to have to continuously rotate the jog dial several turns in order to reach the desired factor, as a result of which user convenience may suffer.

SUMMARY

With the foregoing in view, it is an object of the present invention to improve operability in zoom operation of a presentation device.

In keeping with the stated object, the presentation device of the invention comprises:

a camera head that has a zoom lens unit and shoots an object disposed on a stage;

a driving unit that drives the zoom lens unit to change the shooting field of the camera head towards a telephoto end or a wide end;

an operating unit that has single operation member able to be operated toward at least two different direction;

a detection unit that detects an operating direction and an operating value of the operation member;

a zoom determination unit that determinates the zoom direction of the zoom lens unit to the telephoto end or wide end and zoom speed depending on the detected operating direction and the detected operating value of the operation member;

a zoom control unit that controls the driving unit on the basis of the determined zoom direction and zoom speed; and an image output unit that outputs images shot by the camera head.

According to the presentation device of the invention, zoom speed is adjusted depending on the operating value of the operation member, whereby fine adjustments and coarse adjustments of zoom can be made easily. Additionally, by means of adjusting zoom speed, zoom can be quickly set to a desired zoom factor, without the need to continuously rotate the operation member until the desired zoom factor is reached, as with the jog dial of the prior art. It is thus possible to improve operability in zoom operations.

In a presentation device of the constitution described above, the image output unit comprises means for performing digital zoom on an image shoot by the camera head; and in the event of further operation to the telephoto end by the operation member after driving the zoom lens unit to the telephoto end has reached the limit, the zoom control unit controls the image output unit and performs digital zoom.

By means of this arrangement, it is possible to display a photographic subject at greater enlargement than the maximum enlargement supported by optical zoom. Since switching between optical zoom and digital zoom is carried out at the telephoto end of the zoom lens unit, degradation of picture quality due to digital zoom can be held to a minimum.

In a presentation device of the constitution described above, in the event that digital zoom is performed, the zoom control unit performs digital zoom at a given zoom speed irrespective of the operating value of the operation member.

By means of this arrangement, it can be readily ascertained whether the current zoom operation is being carried out with optical zoom or with digital zoom.

In a presentation device of the constitution described above, the operation member may comprise a rotary body that rotates in forward and reverse direction, with the operating direction and operating value being detected on the basis of rotary operation of the rotary body.

By means of this arrangement, it is possible to adjust intuitively both zoom direction and zoom speed by means of rotary operation of the rotary body.

In this arrangement, the operating unit may comprise a momentary mechanism that in the absence of rotary operation automatically returns the rotation angle to the neutral position.

By means of this arrangement, the rotary body can be returned to the neutral position in the absence of input force, whereby operability can be improved further.

In a presentation device of the constitution described above, the operation member may comprise a touchpad (not shown) as an operation member for detecting motion of a fingertip in contact therewith, and the operation direction and operating value detected on the basis of detected movement of the fingertip.

By means of this arrangement, the operation member may dispense with moving parts, thus reducing the likelihood of damage.

In a presentation device of the constitution described above, the operation member may be disposed on a portion of the stage.

By means of this arrangement, the stable operation is possible with the hand resting on the stage. The operation member is not limited to this arrangement, and may instead be disposed on a remote control or the like for remote operation of the camera head or presentation device.

DESCRIPTION OF THE PREFERRED EMBODIMENTS

The embodiments of the invention are described hereinbelow, in the following order.

Figure 1:
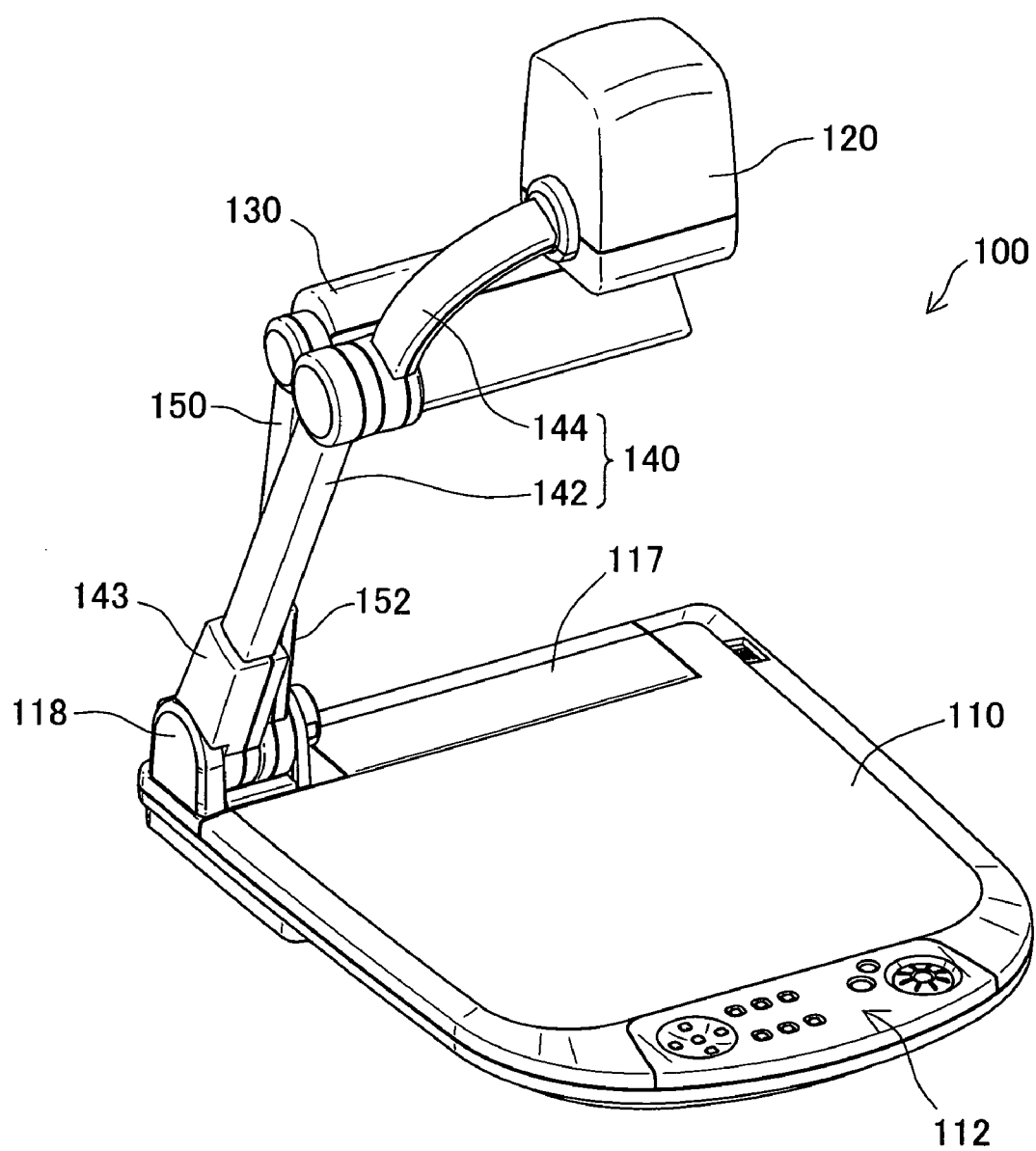
FIG. 1 is a perspective view of a presentation device 100.

A. Overall Arrangement of Presentation Device:
B. Electrical Arrangement of Presentation Device:
C. Shuttle Operation member:
D. Zoom Control Process:
A. Overall Arrangement of Presentation Device:

FIG. 1 is a perspective view of the presentation device 100 pertaining to an embodiment of the present invention. As shown, the presentation device 100 comprises a table 110 on which rests a photographic subject; a camera head 120 positioned over the table 110, for shooting the photographic subject; and a lighting unit 130 for illuminating the photographic subject on the table 110. The table 110 is of square flat panel shape rounded somewhat at the front side, with a control panel 112 disposed on the upper face at the front side.

The camera head 120 is held over the table 110 by a camera retaining arm 140. This camera retaining arm 140 comprises a table-end arm 142 and a camera-end arm 144, and is rotatably retained on the table 110 by the basal portion 143 of the table-end arm 142. The camera-end arm 144 is rotatably linked and fastened to the camera head, and with the table-end arm 142 by means of a linking portion, respectively. Thus, the camera head 120 is integral with the camera-end arm 144 and rotatable about the distal end of the table-end arm 142.

The lighting unit 130 is held over the table 110 by a lighting unit retaining arm 150. This lighting unit retaining arm 150 is rotatably held on the table 110 at its basal portion 152, with the lighting unit rotatably held at the distal end.

Figure 2:
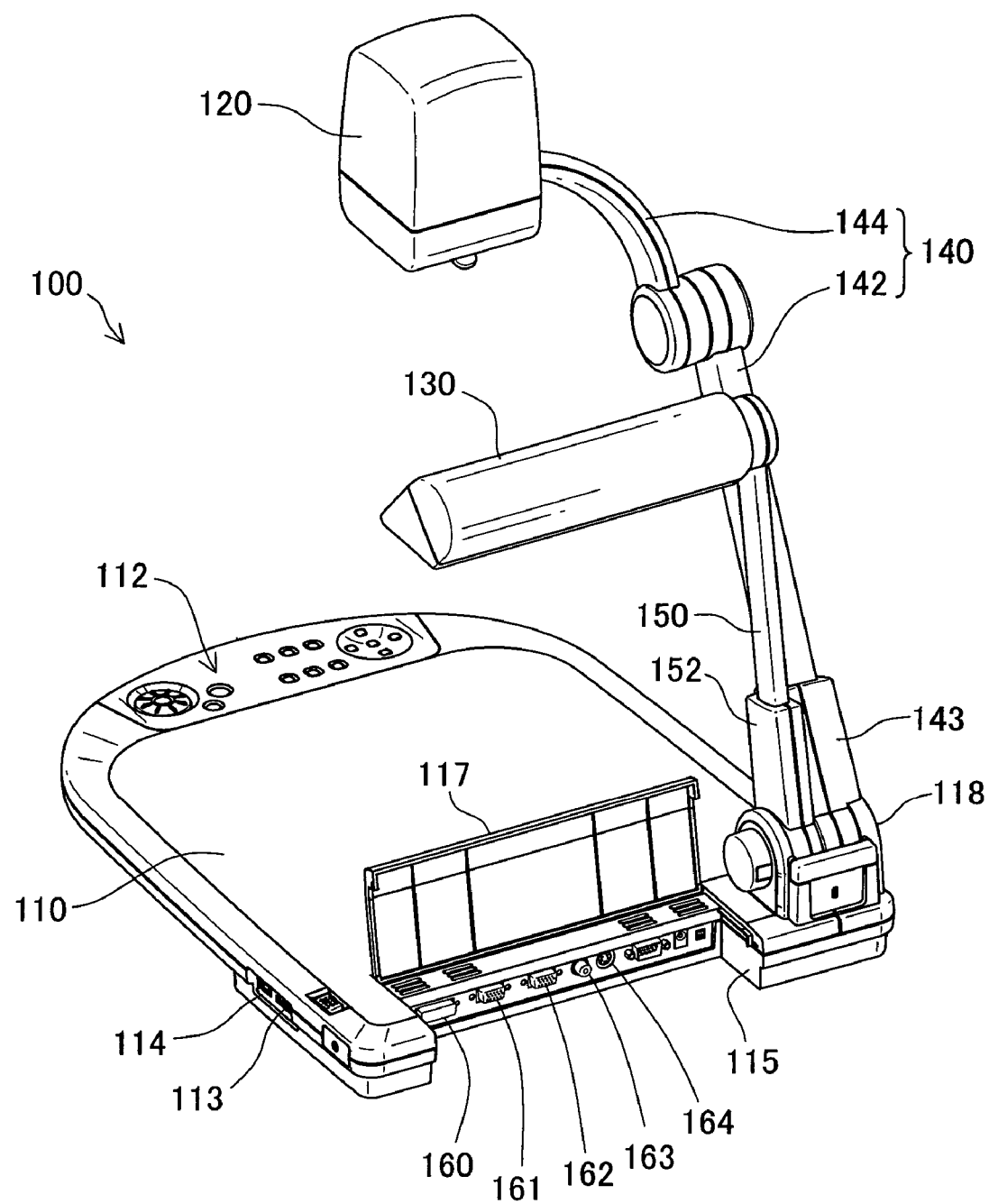
FIG. 2 is a rear perspective view of the presentation device 100.

FIG. 2 is a rear perspective view of the presentation device 100. As illustrated, the table 110 comprises a recess 115 situated in the side wall on the back edge side, the recess 115 being cut out from the upper face of the table and covered by a cover 117. The cover 117 opens and closes in flap configuration, and in the closed state is substantially coplanar with the table upper face of the table 110, with the surface of the cover portion forming a continuous surface with the table upper face. Within the recess 115 covered by the cover 117 are disposed connectors for connection to external devices. The connectors disposed here include a DVI output terminal 160 for connection to a liquid crystal display or the like; an analog RGB input terminal 161 for input of an analog RGB signal from a computer or other external device; an analog RGB input terminal 162 for connection to a CRT or the like; a composite terminal 163 for connection to a television receiver or the like; an S video terminal 164, and the like. On the rear right side wall are disposed a memory card terminal 113 and a USB (Universal Serial Bus) terminal 114.

Figure 3:
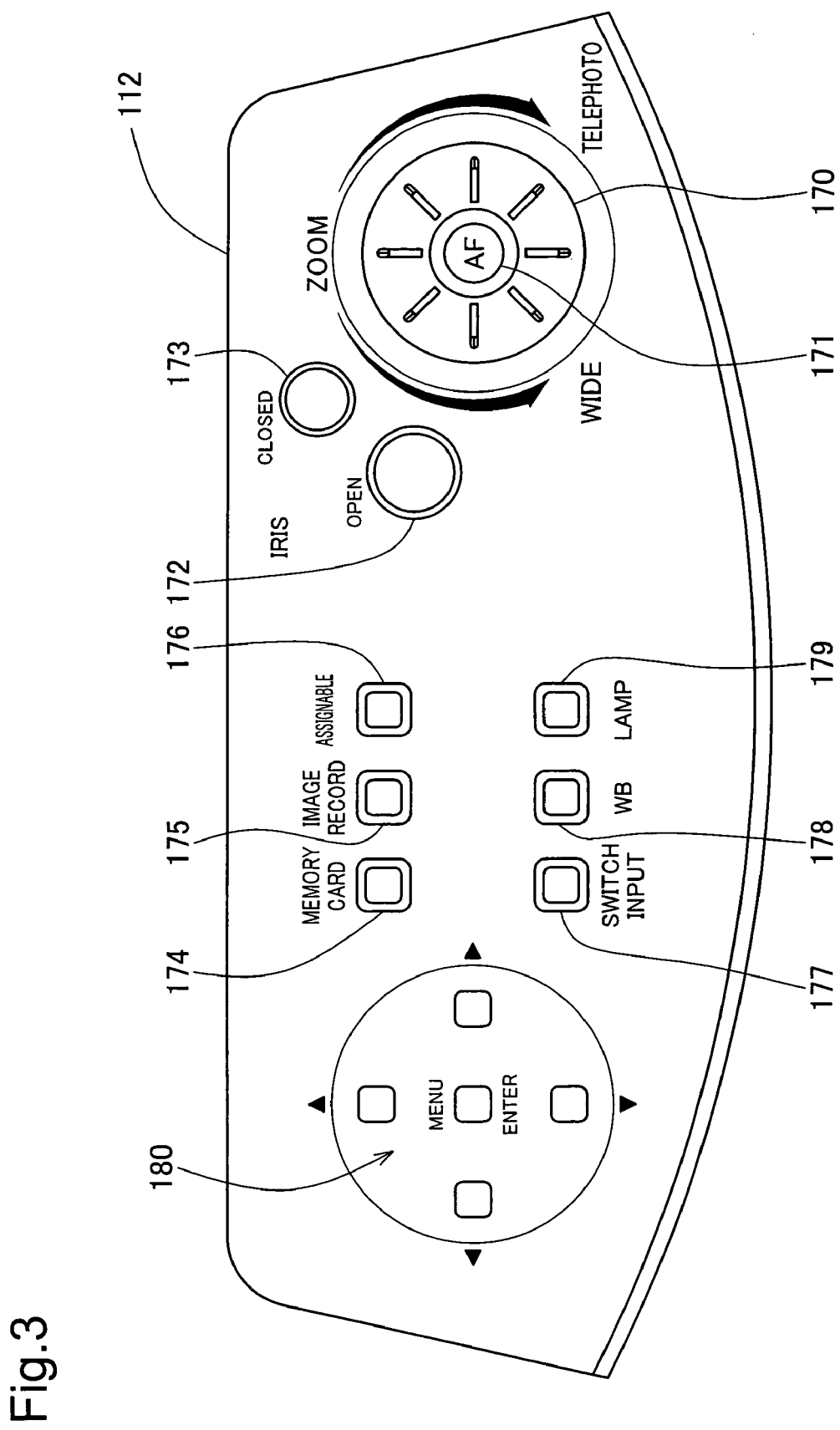
FIG. 3 is an illustration depicting the arrangement of a control panel 112.

FIG. 3 is an illustration depicting the arrangement of the control panel 112. As illustrated, the shuttle operation member 170 for adjusting the zoom direction and zoom speed is disposed on the control panel 112. The shuttle operation member 170 comprises a rotary body rotatable in the forward and reverse direction within an angular range of approximately ±90°; rotation to the right effects zooming to the telephoto end, while rotation to the left effects zooming to the wide end. The shuttle operation member 170 comprises a momentary mechanism, whereby once the user releases the hand from the shuttle operation member 170 after rotary operation, its rotation angle returns automatically to the neutral position. The shuttle operation member 170 could be composed of a SRGPTJ0500 shuttle switch, manufactured by Alps Electric Co. Ltd. or the like, for example.

Additionally disposed on the control panel 112 are an autofocus button 171 situated in the center portion of the shuttle operation member 170, for adjusting focus automatically; iris buttons 172, 173 for adjusting the iris; a memory card button 174 for displaying images recorded onto a memory card; an image record button 175 for recording captured images onto a memory card; an assignable button 176 to which it is possible to assign any desired function; an input switching button 177 for switching between the camera head 120 and an external device as the image input source; a white balance button 178 for selecting automatically adjusted or fixed white balance; a lamp button 179 for switching on and off the lighting unit 130; an OSD button 180 for performing OSD (ON-Screen Display) operations displayed on the screen, and the like.

Figure 4:
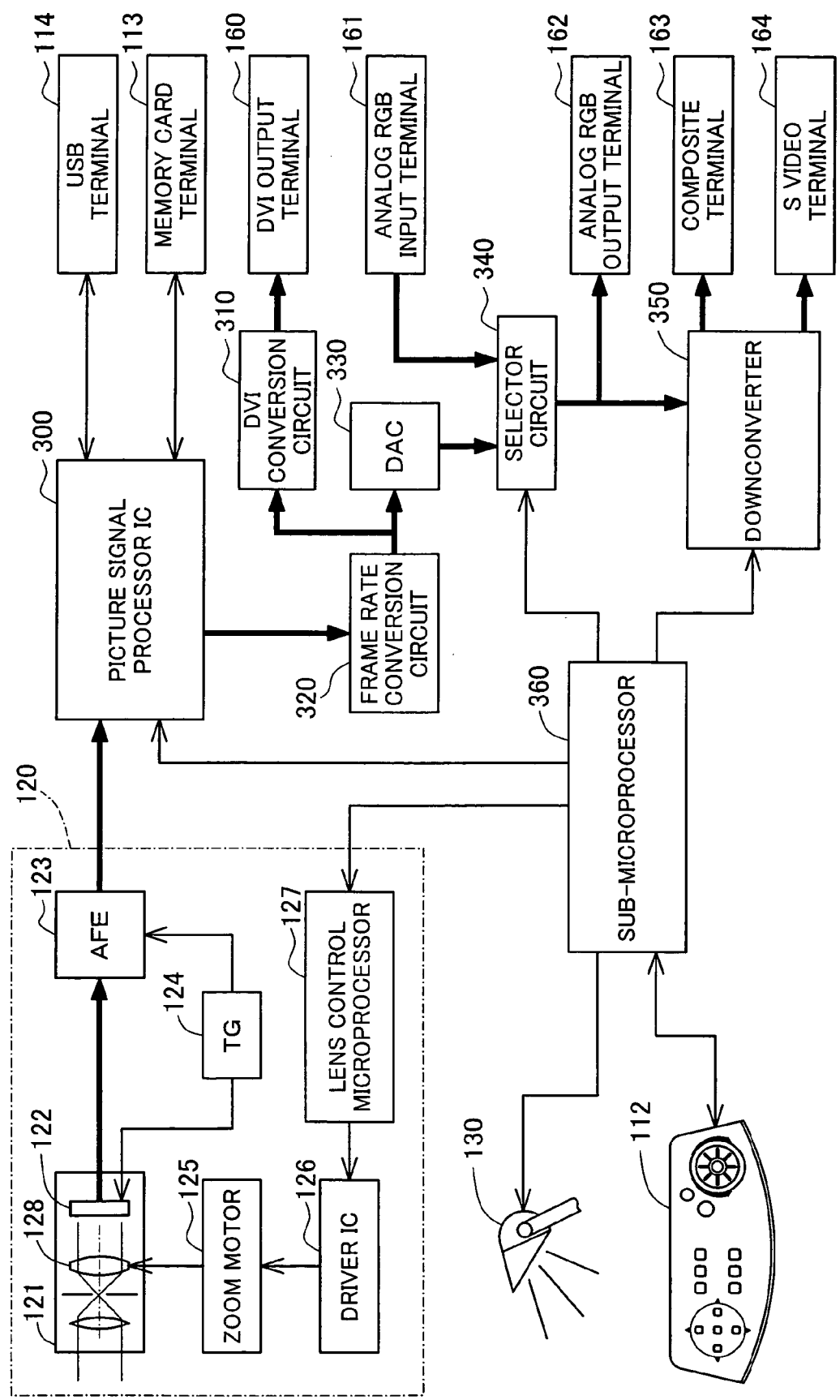
FIG. 4 is a block diagram depicting the electrical arrangement of the presentation device 100.

B. Electrical Arrangement of Presentation Device:

FIG. 4 is a block diagram depicting the electrical arrangement of the presentation device 100. In the drawing, the portion enclosed by the broken lines represents the electrical arrangement within the camera head 120, with the other portion representing primarily the electrical arrangement within the stage 110.

The camera head 120 comprises a zoom lens unit 121 for photographing a photographic subject; a CCD 122 for converting light collected by the lens unit into an electrical signal; an analog front end 123 for converting the analog signal output by the CCD 122 into a digital signal; and a timing generator 124 that outputs a reference pulse for operating the CCD 122 and the analog front end 123.

The lens unit 121 is composed of several lenses, and comprises a zoom lens 128. Within the camera head 120 are disposed a zoom motor 125 for moving the zoom lens 128 to the telephoto end or the wide end, and a driver IC 126 for driving the zoom motor 125. The zoom motor 125 may be composed of a stepping motor or DC motor, for example. The driver IC 126 is connected to a lens control microprocessor 127, and in response to instructions from the lens control microprocessor 127, controls the zoom direction and zoom speed by means of adjusting the frequency and voltage of the signal output to the zoom motor 126. The lens control microprocessor 127 also has a function whereby when the zoom lens 128 has reached the telephoto end or the wide end, a signal to that effect is sent to a sub-microprocessor 360.

The picture signal output by the analog front end 123 is sent to a picture signal processor IC 300 provided within the table 110. This picture signal processor IC 300 is composed of a one-chip microprocessor with an on-board CPU, memory, and ROM, and by means of the CPU executing a program recorded in ROM, can carry out various kinds of image processing, such as digital zoom, on pictures sent from the camera head 120.

Additionally, the memory card terminal 113 and the USB terminal are connected to the picture signal processor IC 300. Using these terminals, the picture signal processor IC 300 can write image data to a memory card, or transfer images to a personal computer via USB.

The picture signal subjected to image processing by the picture signal processor IC 300 is output to a frame rate conversion circuit 320. The frame rate conversion circuit 320 converts the frame rate of the picture signal output by the picture signal processor IC 300 (e.g. 15 frames/sec) to a frame rate suitable for analog RGB output or DVI output (e.g. 60 frames/sec).

A DVI conversion circuit 310 and a DAC 330 are connected to the frame rate conversion circuit 320. The DVI conversion circuit 310 takes the picture signal whose frame rate has been converted by the frame rate conversion circuit 320, and converts it to the DVI signal for standard use by liquid crystal displays and the like, which is then output to the DVI output terminal 160. The DAC 330, on the other hand, subjects the frame rate-converted picture signal to D/A conversion to produce an analog RGB signal. The DAC 330 is connected to a selector circuit 340, and the analog RGB input terminal 161 is connected to the selector circuit 340. In accordance with an instruction from the sub-microprocessor 360, the selector circuit 340 switches the input source of the picture signal to either the DAC 330 or the analog RGB input terminal 161. The picture signal output from the selector circuit 340 is output to the analog RGB output terminal 162 and a downconverter 350. The downconverter 350 converts the input analog RGB signal into a composite signal or S video signal suitable for output to a television receiver, and this signal is then output to the composite terminal 163 or the S video terminal 164.

Additionally disposed within the stage 110 is the sub-microprocessor 360, which handles various control signals output from the control panel 112, and in response to these signals performs control of the picture signal processor IC 300, the lens control microprocessor 127, the lighting unit 130, and so on.

Figure 5A:
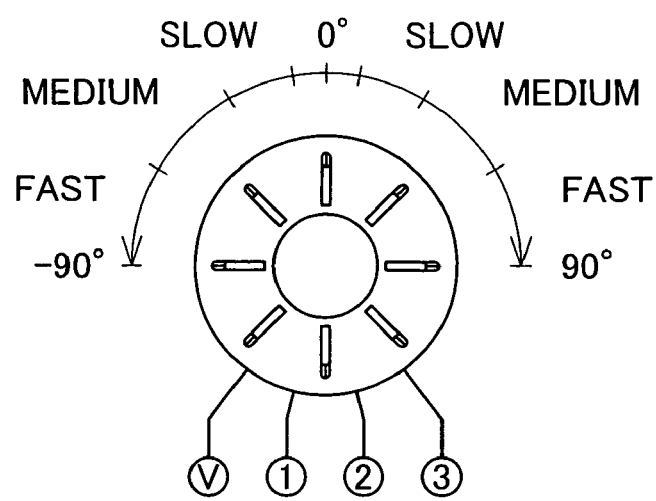
FIG. 5A is an illustration depicting the arrangement of a shuttle operation member 170.
Figure 5B:
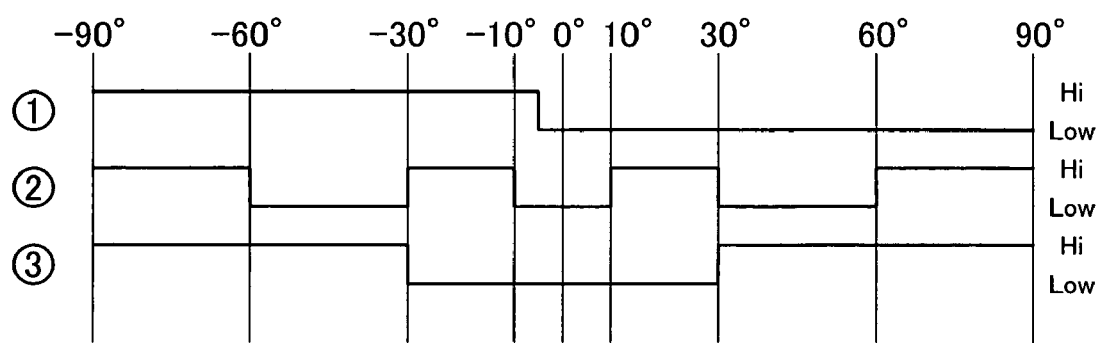
FIG. 5B is an illustration depicting a signal output by a sensor disposed on the shuttle operation member 170.

C. Shuttle Operation Member:

FIG. 5A is an illustration depicting the exterior of the shuttle operation member 170 disposed on the control panel 112; and FIG. 5B is an illustration depicting a signal output from the shuttle operation member 170 to the sub-microprocessor 360. As shown in FIG. 5B, the shuttle operation member 170 comprises a single input terminal and three output terminals, with constant voltage applied to the input terminal V. From the output terminals 1-3, on the other hand, there are output signals as shown at bottom in the drawing, depending on the rotation direction and rotation angle of the shuttle operation member 170.

From output terminal 1 is output a signal that represents rotation direction. Specifically, it goes Low in the case of rotation to the right, and High in the case of rotation to the left. In order to prevent signal instability with the operation member at the neutral position, it is designed so that a Low signal is output in the event that the rotation angle is −5° or greater.

Signals representing rotation angle are output from the output terminal 2 and the output terminal 3. Specifically, in the event that the absolute value of rotation angle is 0° or greater but less than 10°, both of the output terminals 2, 3 go Low, whereas in the event that it is 10° or greater but less than 30°, the output terminal 2 goes High and the output terminal 3 goes Low. In the event that it is 30° or greater but less than 60°, the output terminal 2 goes Low and the output terminal 3 goes High, whereas in the event that it is 60° or greater, both of the output terminals 2, 3 go High.

When the sub-microprocessor 360 inputs the aforementioned signals from the output terminals 1-3 of the shuttle operation member 170, zoom direction and zoom speed are decided upon depending on the input signal status. Specifically, where the signal input from output terminal 1 is a signal indicating rotation to the right, zoom direction is set to the telephoto direction, whereas if it is a signal indicating rotation to the left, it is set to the wide direction. In the event that the signals input from the output terminals 2, 3 are signals representing a rotation angle of 10° or greater but less than 30°, zoom speed is set to low speed, whereas if the signals represent a rotation angle of 30° or greater but less than 60°, it is set to medium speed. Where the signals represent a rotation angle of 60° or greater, zoom speed is set to high speed. Where the signals represent a rotation angle of less than 10°, zoom speed is set to zero.

Figure 6:
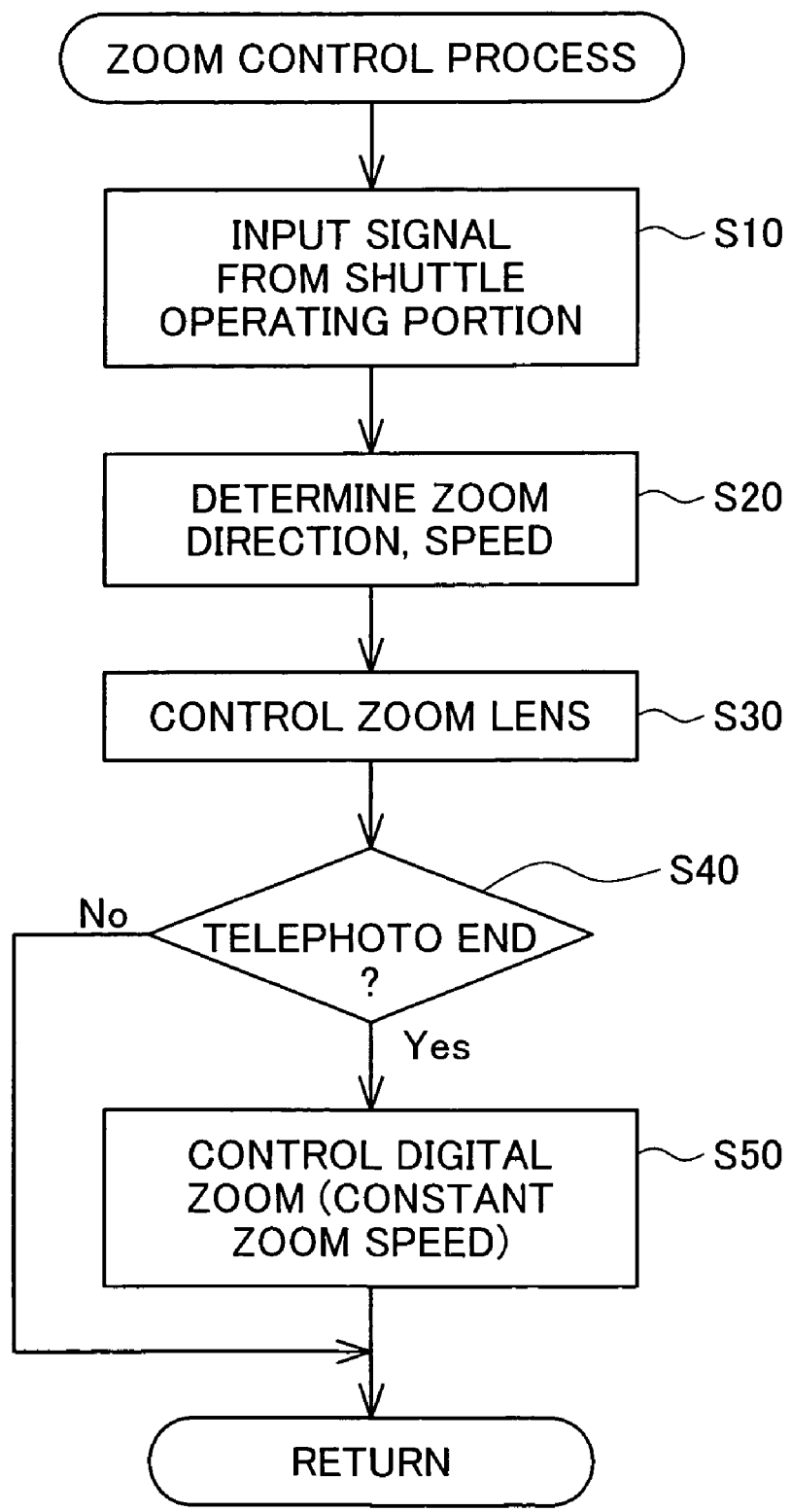
FIG. 6 is a flowchart of the zoom control process.

D. Zoom Control Process:

FIG. 6 is a flowchart of the zoom control process which the sub-microprocessor 360 executes constantly during operation of the presentation device 100.

When this process is executed, the sub-microprocessor 360 first inputs the signals output by the shuttle operation member 170 (Step S10). Zoom direction and zoom speed are determined depending on the input signals, in accordance with the preceding description (Step S20).

Next, the sub-microprocessor 360 transmits to the lens control microprocessor 127 the zoom direction and zoom speed determined in the previous Step S20, and performs optical zoom on the basis of this parameter data (Step S30).

At this time, in the event that the sub-microprocessor 360 has received from the lens control microprocessor 127 a signal indicating that the zoom lens has reached the telephoto end (Step S40), the aforementioned parameters are sent to the picture signal processor IC 300 rather than to the lens control microprocessor 127, and digital zoom is carried out (Step S50). When carrying out digital zoom, the picture signal processor IC 300 performs digital zoom at given speed irrespective of the transmitted parameters that represent zoom speed. By so doing, it is possible to easily discern whether a current zoom operation is with optical zoom or with digital zoom.

By means of continuously executing the series of process described hereinabove, the sub-microprocessor 360 can carry out either optical zoom or digital zoom, depending on rotary operation of the shuttle operation member 170.

According to the presentation device of the embodiment constituted in the manner set forth hereinabove, since zoom speed can be adjusted depending on the rotation angle of the shuttle operation member 170, fine adjustments or coarse adjustments of zoom can be made readily with a single operation member. Additionally, since it is not necessary to rotate the dial a number of times until the desired zoom factor is reached, as with the jog dial of the prior art, zoom can be efficiently set to a desired zoom factor. Further, since zoom format switches to digital zoom at the point in time that zoom by optical zoom reaches its limit, degradation of picture quality due to digital zoom can be held to a minimum. Additionally, since zoom speed becomes constant at the point in time of switchover from optical zoom to digital zoom, it is possible to readily discern which zoom format is currently being used.

While the invention has been described in terms of a certain preferred embodiment, the invention is in no wise limited by the embodiment herein, and may be reduced to practice in various forms without departing from the spirit of the invention.

For example, in the preceding embodiment, zoom direction and speed are adjusted on the basis of rotary operation of the shuttle operation member 170; however, zoom direction and speed could instead be adjusted using a stick, lever, slide switch or other device able to differentiate direction of operation from among at least two different directions, and to detect operating value in each direction of operation. Alternatively, movement of a fingertip could be detected by means of a touchpad (not shown) that detects motion the fingertip in contact therewith, and zoom direction and speed adjusted depending on the direction of movement and the level of movement.

In the embodiment herein, the sub-microprocessor 360 performs the zoom control process, but it could instead be performed by the picture signal processor IC 300 or the lens control microprocessor 127.

In the embodiment herein, the shuttle operation member 170 is situated in a portion of the stage 110, but could instead be mounted on a portion of the camera head 120. It could also be located on a remote control capable of remote operation of the presentation device 100.

In the embodiment herein, zoom operation of the zoom lens to the telephoto end or the wide end is achieved by means of changing the position of the zoom lens with the zoom motor 125, but it would also be acceptable to have an arrangement whereby zoom is effective by changing the refractive index of a lens of material whose refractive index varies with applied voltage; or to employ a lens of a type housing a transparent gel-like substance whose lens curvature changes with application of a signal from the outside, and changing the curvature of the lens facing that constitutes the zoom lens.

The present invention is not limited in any way to the embodiments set forth hereinabove, the scope thereof being determined by the appended claims, and by extension, determined by the known prior art and the spirit of the invention as represented in the specification and drawings.

What is claimed is:

1. A presentation device comprising:
    a camera head that has a zoom lens unit and shoots an object disposed on a stage;
    a driving unit that drives the zoom lens unit to change the shooting field of the camera head towards a telephoto end or a wide end;
    an operating unit that has single operation member able to be operated toward at least two different direction;
    a detection unit that detects an operating direction and an operating value of the operation member;
    a zoom determination unit that determinates the zoom direction of the zoom lens unit to the telephoto end or wide end and zoom speed depending on the detected operating direction and the detected operating value of the operation member;
    a zoom control unit that controls the driving unit on the basis of the determined zoom direction and zoom speed;
    an image output unit that outputs images shot by the camera head; and
    a button situated in a center portion of the operation member for adjusting focus of the camera head.

2. A presentation device according to claim 1,
    wherein the operation member comprises a rotary body that rotates in forward and reverse direction, with the operating direction and operating value being detected on the basis of rotary operation of the rotary body; and
    wherein the operating unit comprises a momentary mechanism that in the absence of rotary operation automatically returns the rotation angle of the rotary body to the neutral position.

3. A presentation device in accordance with claim 2, wherein
    the image output unit comprises means for performing digital zoom on an image shoot by the camera head; and
    in the event of further operation to the telephoto end by the operation member after driving the zoom lens unit to the telephoto end has reached the limit, the zoom control unit controls the image output unit and performs digital zoom.

4. A presentation device in accordance with claim 3, wherein
    in the event that digital zoom is performed, the zoom control unit performs digital zoom at a given zoom speed irrespective of the operating value of the operation member.

5. A presentation device in accordance with claim 1, further comprising a stage where an object is disposed, and wherein the operating unit is disposed on a portion of the stage.

6. A presentation device comprising:
    a camera head that has a zoom lens unit, for shooting an object disposed on a stage;
    a motor that moves the location of at least one lens in the zoom lens unit;
    a drive circuit that drives the motor, to change the shooting field of the camera head towards the telephoto end or the wide end;
    a rotary body that is disposed at a peripheral edge of the stage and is rotated clockwise and counterclockwise, substantially co-planar with the stage;
    a sensor that detects whether the operating direction of the rotary body is the clockwise or counterclockwise direction and the operating value in each operating direction, and outputs a first signal depending on the operating direction and a second signal depending on the operating value;
    a control circuit that with reference to the first signal from the sensor determines whether the zoom direction of the zoom lens unit is towards the telephoto end or the wide end and with reference to the second signal determines the zoom speed, and outputs to the motor a signal corresponding to the zoom direction and zoom speed so determined;
    an image output circuit for outputting a picture signal shot by the camera head; and
    a button situated in a center portion of the rotary body for adjusting focus of the camera head.

7. A presentation device according to claim 6,
    wherein the rotary body comprises a momentary mechanism that in the absence of rotary operation automatically returns the rotation angle of the rotary body to the neutral position.

8. A presentation method for displaying images shot by a camera head that has a zoom lens unit, the method comprising:
    detecting an operating direction from among at least two different directions and an operating value depending on an operation of a single operation member;
    determining a zoom direction of the zoom lens unit to a telephoto end or wide end depending on the detected operating direction;
    determining a zoom speed depending on the detected operating value;
    controlling a shooting field of the camera head through driving the zoom lens unit on the basis of the determined zoom direction and zoom speed;
    outputting images shot by the camera head during and after driving the zoom lens unit; and
    utilizing a button situated in a center portion of the operation member for adjusting focus of the camera head.

9. A presentation method according to claim 8, wherein the operation member comprises a rotary body that rotates in forward and reverse direction, with the operating direction and operating value being detected on the basis of rotary operation of the rotary body; and wherein the operating unit comprises a momentary mechanism that in the absence of rotary operation automatically returns the rotation angle of the rotary body to the neutral position.

\* \* \* \* \*